United States Patent
Chen et al.

(10) Patent No.: US 12,034,158 B2
(45) Date of Patent: Jul. 9, 2024

(54) LITHIUM BATTERY STRUCTURE

(71) Applicant: INDUSTRIAL TECHNOLOGY RESEARCH INSTITUTE, Hsinchu (TW)

(72) Inventors: Li-Chun Chen, Keelung (TW); Tsung-Hsiung Wang, Dali (TW); Chen-Chung Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 131 days.

(21) Appl. No.: 17/096,679

(22) Filed: Nov. 12, 2020

(65) Prior Publication Data

US 2021/0151750 A1 May 20, 2021

Related U.S. Application Data

(60) Provisional application No. 62/934,155, filed on Nov. 12, 2019.

(51) Int. Cl.
*H01M 4/46* (2006.01)
*H01M 4/62* (2006.01)

(52) U.S. Cl.
CPC .......... *H01M 4/463* (2013.01); *H01M 4/623* (2013.01); *H01M 4/625* (2013.01)

(58) Field of Classification Search
CPC ........................................ H01M 4/623–625
See application file for complete search history.

(56) References Cited

U.S. PATENT DOCUMENTS 10,326,173 B2 6/2019 Fan et al.
2008/0241684 A1 10/2008 Muraoka et al.
(Continued)

FOREIGN PATENT DOCUMENTS

CN 1699510 A 11/2005
CN 101471435 A 7/2009
(Continued)

OTHER PUBLICATIONS

Taiwanese Office Action and Search Report for Taiwanese Application No. 109139568, dated Apr. 15, 2021.
(Continued)

*Primary Examiner* — Stephan J Essex
(74) *Attorney, Agent, or Firm* — Birch, Stewart, Kolasch & Birch, LLP

(57) ABSTRACT

A lithium battery structure is provided. The lithium battery structure includes a first metal layer including aluminum foil or stainless steel foil, a second metal layer including copper foil, nickel foil or stainless steel foil, a separator, a first electrode layer, a second electrode layer, and a first functional layer including a first composition. The separator is disposed between the first metal layer and the second metal layer. The first electrode layer is disposed between the first metal layer and the separator. The second electrode layer is disposed between the second metal layer and the separator. The first functional layer is disposed between the first metal layer and the first electrode layer. The first composition includes 20-80 parts by weight of flake conductive material, 1-30 parts by weight of spherical conductive material, 10-50 parts by weight of thermoplastic elastomer and 1-25 parts by weight of nitrogen-containing hyperbranched polymer.

9 Claims, 6 Drawing Sheets

(56) References Cited

U.S. PATENT DOCUMENTS

| | | |
|---|---|---|
| 2014/0178751 A1 | 6/2014 | Wang et al. |
| 2014/0178753 A1 | 6/2014 | Chu et al. |

FOREIGN PATENT DOCUMENTS

| | | |
|---|---|---|
| CN | 102544413 A | 7/2012 |
| CN | 103194161 A | 7/2013 |
| CN | 104577129 A | 4/2015 |
| CN | 104810507 A | 7/2015 |
| CN | 106024420 A | 10/2016 |
| CN | 106486639 A | 3/2017 |
| JP | 10-172615 A | 6/1998 |
| JP | 11-283808 A | 10/1999 |
| JP | 2001-110403 A | 4/2001 |
| JP | 2010157512 A | 7/2010 |
| JP | 2016-164868 A | 9/2016 |
| JP | WO2017/018287 A1 | 2/2017 |
| JP | 2018137124 A * | 8/2018 |
| JP | 2019-36490 A | 3/2019 |
| JP | 2019036490 A * | 3/2019 |
| TW | I411149 B | 10/2013 |
| TW | I482344 B | 4/2015 |
| TW | I509864 B | 11/2015 |
| TW | I550655 B | 9/2016 |
| TW | I652847 B | 3/2019 |
| WO | 2014/051043 A1 | 4/2014 |
| WO | 2017/104583 A1 | 6/2017 |
| WO | 2019/066066 A1 | 4/2019 |

OTHER PUBLICATIONS

Japanese Office Action for Japanese Application No. 2020-188940, dated Apr. 12, 2022, with English translation.
Japanese Office Action for Japanese Application No. 2020-188940, dated Oct. 11, 2022, with English translation.
Chinese Office Action and Search Report for Chinese Application No. 202011263777.9, dated Oct. 19, 2023.

* cited by examiner

LITHIUM BATTERY STRUCTURE

CROSS REFERENCE TO RELATED APPLICATIONS

This application claims the benefit of U.S. Provisional Application No. 62/934,155, filed on Nov. 12, 2019, the entirety of which is incorporated by reference herein.

TECHNICAL FIELD

The disclosure relates to a lithium battery structure, and more particularly to a lithium battery structure with a function of over-temperature current blocking.

BACKGROUND

Lithium batteries are generally used to drive electronic products (such as mobile phones, robots, AR glasses, etc.) and electric vehicles. However, lithium batteries frequently explode. The safety requirements have become an important basis for consumers to adopt lithium batteries.

The safety problems associated with the use of lithium batteries are mainly due to the increase in the internal temperature of the battery, including improper heating of the battery, overcharging, and short-circuits caused by contact of the positive and negative materials, which causes the internal temperature of the lithium battery to rise. A lithium battery is composed of a lithium-alloy-oxide positive electrode, a liquid organic electrolyte, and a carbon-material negative electrode. When the internal temperature continues to rise and cannot be controlled, the separator that separates the positive and negative electrodes may begin to melt and break, causing a wide range of short-circuits, which make the temperature of the battery rise rapidly, and the heat energy can lead to explosion. As the voltage rises, the battery expands like an inflatable ball, and finally bursts and spews out a lot of gas, causing the lithium battery to catch fire or explode.

Therefore, development of a lithium battery structure with a function of over-temperature current blocking is desirable.

SUMMARY

In accordance with one embodiment of the disclosure, a lithium battery structure is provided. The lithium battery structure includes a first metal layer, a second metal layer, a separator, a first electrode layer, a second electrode layer and a first functional layer. The first metal layer includes aluminum foil or stainless steel foil. The second metal layer includes copper foil, nickel foil or stainless steel foil and is opposite to the first metal layer. The separator is disposed between the first metal layer and the second metal layer. The first electrode layer is disposed between the first metal layer and the separator. The second electrode layer is disposed between the second metal layer and the separator. The first functional layer includes a first composition. The first functional layer is disposed between the first metal layer and the first electrode layer. The first composition includes 20-80 parts by weight of flake conductive material, 1-30 parts by weight of spherical conductive material, 10-50 parts by weight of thermoplastic elastomer and 1-25 parts by weight of nitrogen-containing hyperbranched polymer, based on 100 parts by weight of the first composition.

In accordance with one embodiment of the disclosure, a lithium battery structure is provided. The lithium battery structure includes a first metal layer, a second metal layer, a separator, a first electrode layer, a second electrode layer and a first functional layer. The first metal layer includes aluminum foil or stainless steel foil. The second metal layer includes copper foil, nickel foil or stainless steel foil and is opposite to the first metal layer. The separator is disposed between the first metal layer and the second metal layer. The first electrode layer is disposed between the first metal layer and the separator. The second electrode layer is disposed between the second metal layer and the separator. The first functional layer includes a first composition. The first functional layer is disposed between the second metal layer and the second electrode layer. The first composition includes 20-80 parts by weight of flake conductive material, 1-30 parts by weight of spherical conductive material, 10-50 parts by weight of thermoplastic elastomer and 1-25 parts by weight of nitrogen-containing hyperbranched polymer, based on 100 parts by weight of the first composition.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is determined by reference to the appended claims.

In order to improve the safety of batteries during operation, the present disclosure provides a lithium battery structure with a function of over-temperature current blocking. The single functional layer with a specific composition (including specific parts by weight of flake conductive material, spherical conductive material, thermoplastic elastomer and nitrogen-containing hyperbranched polymer, etc.) is disposed between the metal current collector and the positive electrode, or between the metal current collector and the negative electrode. Alternatively, the two functional layers with the above-mentioned specific composition are respectively disposed between the metal current collector and the positive electrode, and between the metal current collector and the negative electrode. When the operating temperature is higher than 150° C., the Z-axis dimension of the functional layer in the battery will irreversibly expand. As a result, the conductive network inside the battery is cut off and destroyed, causing the resistance to rise rapidly and forming a disconnection. Therefore, it is ensured that the battery will not continue to increase in temperature or cause combustion and explosion under this temperature condition.

Figure 1:
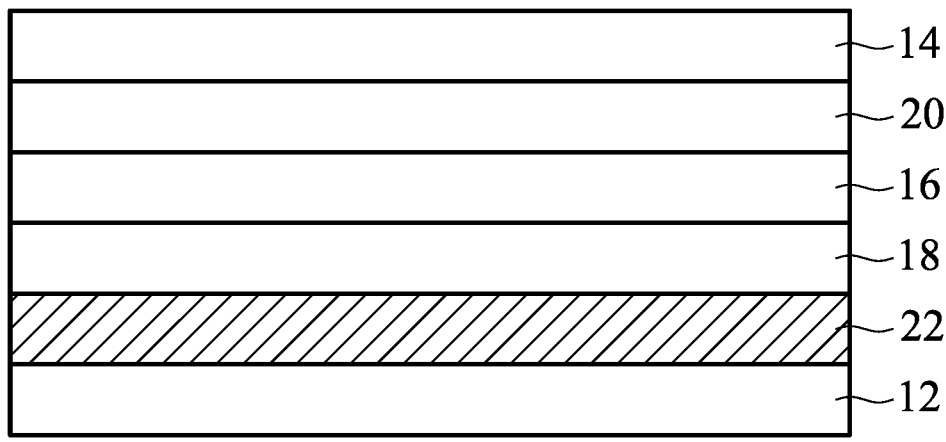
FIG. 1 is a cross-sectional view of a lithium battery structure in accordance with one embodiment of the disclosure.

Referring to FIG. 1, in accordance with one embodiment of the disclosure, a lithium battery structure 10 is provided. FIG. 1 is a cross-sectional view of the lithium battery structure 10.

As shown in FIG. 1, the lithium battery structure 10 includes a first metal layer 12, a second metal layer 14, a separator 16, a first electrode layer 18, a second electrode layer 20 and a functional layer 22. The first metal layer 12 is opposite to the second metal layer 14. The separator 16 is disposed between the first metal layer 12 and the second metal layer 14. The first electrode layer 18 is disposed between the first metal layer 12 and the separator 16. The second electrode layer 20 is disposed between the second metal layer 14 and the separator 16. The functional layer 22 is disposed between the first metal layer 12 and the first electrode layer 18. Specifically, the functional layer 22 includes a composition. The composition includes 20-80 parts by weight of flake conductive material, 1-30 parts by weight of spherical conductive material, 10-50 parts by weight of thermoplastic elastomer and 1-25 parts by weight of nitrogen-containing hyperbranched polymer, based on 100 parts by weight of the composition. In some embodiments, the composition in the functional layer 22 may include 40-75 parts by weight of flake conductive material, 3-25 parts by weight of spherical conductive material, 15-35 parts by weight of thermoplastic elastomer and 3-15 parts by weight of nitrogen-containing hyperbranched polymer, based on 100 parts by weight of the composition. In some embodiments, the composition in the functional layer 22 may include 48-65 parts by weight of flake conductive material, 5-18 parts by weight of spherical conductive material, 18-28 parts by weight of thermoplastic elastomer and 5-10 parts by weight of nitrogen-containing hyperbranched polymer, based on 100 parts by weight of the composition.

In some embodiments, the first metal layer 12 may include aluminum foil or stainless steel foil, used as a metal current collector. In some embodiments, the second metal layer 14 may include copper foil, nickel foil or stainless steel foil, used as a metal current collector.

In some embodiments, the first electrode layer 18 is a positive electrode, which may include a positive electrode active material, a conductive material and a binder. In some embodiments, the positive electrode active material may include $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$ (0<y<1), $LiCo_{1-y}Mn_yO_2$ (0<y<1), $LiNi_{1-y}Mn_yO_2$ (0<y<1), $Li(Ni_aCo_bMn_c)O_4$ (0<a<2, 0<b<2, 0<c<2, a+b+c=2), $LiMn_{2-z}Ni_zO_4$ (0<z<2), $LiMn_{2-z}Co_zO_4$ (0<z<2), $LiNi_xCo_yAl_zO_2$ (0<x, y, z<1), $LiCoPO_4$, $LiFePO_4$ or a combination thereof, but the present disclosure is not limited thereto, and other suitable positive electrode active materials are applicable to the present disclosure. In some embodiments, the conductive material suitable for use in the positive electrode may include carbon black, conductive graphite, carbon nanotube, carbon fiber or graphene, but the present disclosure is not limited thereto, and other conductive materials applicable to the positive electrode are appli- cable to the present disclosure. In some embodiments, the binder suitable for use in the positive electrode may include polyvinyl alcohol, polytetrafluoroethylene, carboxymethyl cellulose, polyvinylidene fluoride, polystyrene butadiene copolymer, fluorinated rubber, polyurethane, polyvinyl pyrrolidone, polyethyl acrylate, polyvinyl chloride, polyacrylonitrile, polybutadiene, polyacrylic acid or a combination thereof, but the present disclosure is not limited thereto, and other binders applicable to the positive electrode are applicable to the present disclosure. In some embodiments, the second electrode layer 20 is a negative electrode, which may include a negative electrode active material, a conductive material and a binder. In some embodiments, the negative electrode active material may include lithium, carbon materials, lithium-containing compounds, silicon-containing materials or a combination thereof, but the present disclosure is not limited thereto, and other suitable negative electrode active materials are applicable to the present disclosure. In some embodiments, the carbon material may include mesophase carbon micro beads (MCMB), coke, carbon black, graphite, graphene, acetylene black, carbon fiber or a combination thereof. In some embodiments, the lithium-containing compound may include LiAl, LiMg, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$ or $Li_{2.6}Cu_{0.4}N$. In some embodiments, the silicon-containing material may include siloxane ceramics, silicon carbon or silicon-based negative electrode material. In some embodiments, the conductive material suitable for use in the negative electrode may include carbon black, conductive graphite, carbon nanotube, carbon fiber or graphene, but the present disclosure is not limited thereto, and other conductive materials applicable to the negative electrode are applicable to the present disclosure. In some embodiments, the binder suitable for use in the negative electrode may include polyvinyl alcohol, polytetrafluoroethylene, carboxymethyl cellulose, polyvinylidene fluoride, polystyrene butadiene copolymer, fluorinated rubber, polyurethane, polyvinyl pyrrolidone, polyethyl acrylate, polyvinyl chloride, polyacrylonitrile, polybutadiene, polyacrylic acid or a combination thereof, but the present disclosure is not limited thereto, and other binders applicable to the negative electrode are applicable to the present disclosure.

In some embodiments, the flake conductive material in the composition of the functional layer 22 may include graphite or graphene, for example, KS series graphite (Timcal), but the present disclosure is not limited thereto, other suitable flake conductive materials are applicable to the present disclosure. In some embodiments, the dimension of the flake conductive material is approximately in the micron scale, and its dimension is approximately between 0.5 μm and 20 μm, for example, between about 1 μm and about 8 μm. In some embodiments, the spherical conductive material in the composition of the functional layer 22 may include conductive carbon materials, such as Super P (IMERYS Graphite & Carbon SA) and ECP series Ketjenblack (LION Co. Ltd.), but the present disclosure is not limited thereto, other suitable spherical conductive materials are applicable to the present disclosure. In some embodiments, the dimension of the spherical conductive material is approximately in the nano scale, and its dimension is approximately between 10 nm and 1,000 nm, for example, between about 30 nm and about 100 nm. In the present disclosure, the flake conductive materials added to the functional layer 22 are mostly arranged in a planar manner to form a specific directionality, which is conducive to improving the effect of current blocking.

In some embodiments, the thermoplastic elastomer in the composition of the functional layer 22 may include fluoropolymer elastomer, polyolefin elastomer, polyamide elastomer, polyimide elastomer, polyester elastomer, polyurethane elastomer or polycarbonate elastomer, for example, poly(vinylidene fluoride) (PVDF), but the present disclosure is not limited thereto, other suitable thermoplastic elastomers are applicable to the present disclosure. In some embodiments, the nitrogen-containing hyperbranched polymer in the composition of the functional layer 22 may be polymerized from bismaleimide (BMI) monomers, for example, polymerized from 4,4'-diphenylmethane bismaleimide or bisphenol A diphenyl ether bismaleimide, but the present disclosure is not limited thereto, other suitable bismaleimide (BMI) monomer derivatives are applicable to the polymerization of the nitrogen-containing hyperbranched polymer of the present disclosure. In some embodiments, the molecular weight of the nitrogen-containing hyperbranched polymer is approximately between 5,000 and 1,500,000, such as between 20,000 and 1,000,000.

In some embodiments, the thermoplastic elastomer and the nitrogen-containing hyperbranched polymer form an interpenetrating polymer network (IPN). In some embodiments, the composition of the functional layer 22 further includes 0.1-5 parts by weight of bromine-containing compounds, for example, 0.1-1.5 parts by weight of bromine-containing compounds. In some embodiments, the bromine-containing compound may include, for example, 1,2-Bis(2,3,4,5,6-pentabromophenyl)ethane, but the present disclosure is not limited thereto, other suitable bromine-containing compounds are applicable to the present disclosure. The disclosed bromine-containing compounds have flame-retardant properties, which is conducive to improving battery safety.

In some embodiments, the thickness of the functional layer 22 is approximately between 1 μm and 20 μm.

Figure 2:
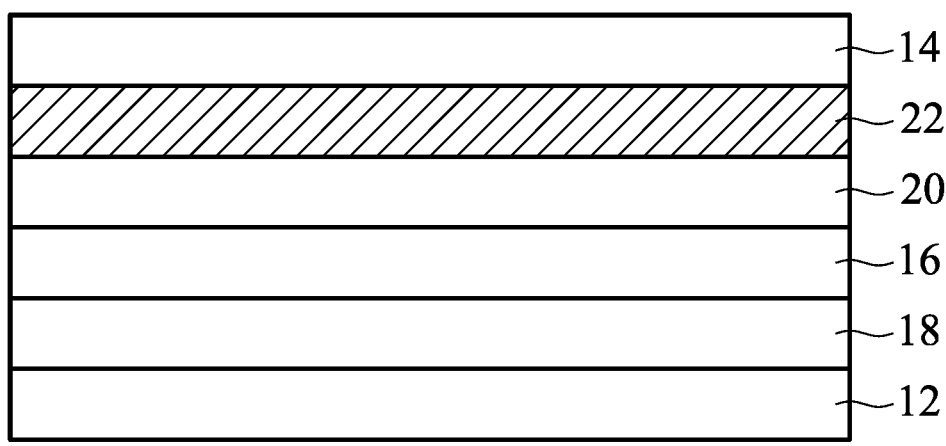
FIG. 2 is a cross-sectional view of a lithium battery structure in accordance with one embodiment of the disclosure.

Referring to FIG. 2, in accordance with one embodiment of the disclosure, a lithium battery structure 10 is provided. FIG. 2 is a cross-sectional view of the lithium battery structure 10.

As shown in FIG. 2, the lithium battery structure 10 includes a first metal layer 12, a second metal layer 14, a separator 16, a first electrode layer 18, a second electrode layer 20 and a functional layer 22. The first metal layer 12 is opposite to the second metal layer 14. The separator 16 is disposed between the first metal layer 12 and the second metal layer 14. The first electrode layer 18 is disposed between the first metal layer 12 and the separator 16. The second electrode layer 20 is disposed between the second metal layer 14 and the separator 16. The functional layer 22 is disposed between the second metal layer 14 and the second electrode layer 20. Specifically, the functional layer 22 includes a composition. The composition includes 20-80 parts by weight of flake conductive material, 1-30 parts by weight of spherical conductive material, 10-50 parts by weight of thermoplastic elastomer and 1-25 parts by weight of nitrogen-containing hyperbranched polymer, based on 100 parts by weight of the composition. In some embodiments, the composition in the functional layer 22 may include 40-75 parts by weight of flake conductive material, 3-25 parts by weight of spherical conductive material, 15-35 parts by weight of thermoplastic elastomer and 3-15 parts by weight of nitrogen-containing hyperbranched polymer, based on 100 parts by weight of the composition. In some embodiments, the composition in the functional layer 22 may include 48-65 parts by weight of flake conductive material, 5-18 parts by weight of spherical conductive material, 18-28 parts by weight of thermoplastic elastomer and 5-10 parts by weight of nitrogen-containing hyperbranched polymer, based on 100 parts by weight of the composition.

In some embodiments, the first metal layer 12 may include aluminum foil or stainless steel foil, used as a metal current collector. In some embodiments, the second metal layer 14 may include copper foil, nickel foil or stainless steel foil, used as a metal current collector.

In some embodiments, the first electrode layer 18 is a positive electrode, which may include a positive electrode active material, a conductive material and a binder. In some embodiments, the positive electrode active material may include $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$ ($0<y<1$), $LiCo_{1-y}Mn_yO_2$ ($0<y<1$), $LiNi_{1-y}Mn_yO_2$ ($0<y<1$), $Li(Ni_aCo_bMn_c)O_4$ ($0<a<2$, $0<b<2$, $0<c<2$, $a+b+c=2$), $LiMn_{2-z}Ni_zO_4$ ($0<z<2$), $LiMn_2$—$Co_zO_4$ ($0<z<2$), $LiNi_xCo_yAl_zO_2$ ($0<x, y, z<1$), $LiCoPO_4$, $LiFePO_4$ or a combination thereof, but the present disclosure is not limited thereto, and other suitable positive electrode active materials are applicable to the present disclosure. In some embodiments, the conductive material suitable for use in the positive electrode may include carbon black, conductive graphite, carbon nanotube, carbon fiber or graphene, but the present disclosure is not limited thereto, and other conductive materials applicable to the positive electrode are applicable to the present disclosure. In some embodiments, the binder suitable for use in the positive electrode may include polyvinyl alcohol, polytetrafluoroethylene, carboxymethyl cellulose, polyvinylidene fluoride, polystyrene butadiene copolymer, fluorinated rubber, polyurethane, polyvinyl pyrrolidone, polyethyl acrylate, polyvinyl chloride, polyacrylonitrile, polybutadiene, polyacrylic acid or a combination thereof, but the present disclosure is not limited thereto, and other binders applicable to the positive electrode are applicable to the present disclosure. In some embodiments, the second electrode layer 20 is a negative electrode, which may include a negative electrode active material, a conductive material and a binder. In some embodiments, the negative electrode active material may include lithium, carbon materials, lithium-containing compounds, silicon-containing materials or a combination thereof, but the present disclosure is not limited thereto, and other suitable negative electrode active materials are applicable to the present disclosure. In some embodiments, the carbon material may include mesophase carbon micro beads (MCMB), coke, carbon black, graphite, graphene, acetylene black, carbon fiber or a combination thereof. In some embodiments, the lithium-containing compound may include LiAl, LiMg, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{26}Co_{0.4}N$ or $Li_{26}Cu_{0.4}N$. In some embodiments, the silicon-containing material may include siloxane ceramics, silicon carbon or silicon-based negative electrode material. In some embodiments, the conductive material suitable for use in the negative electrode may include carbon black, conductive graphite, carbon nanotube, carbon fiber or graphene, but the present disclosure is not limited thereto, and other conductive materials applicable to the negative electrode are applicable to the present disclosure. In some embodiments, the binder suitable for use in the negative electrode may include polyvinyl alcohol, polytetrafluoroethylene, carboxymethyl cellulose, polyvinylidene fluoride, polystyrene butadiene copolymer, fluorinated rubber, polyurethane, polyvinyl pyrrolidone, polyethyl acrylate, polyvinyl chloride, polyacrylonitrile, polybutadiene, polyacrylic acid or a combination thereof, but the present disclosure is not not limited thereto, and other binders applicable to the negative electrode are applicable to the present disclosure.

In some embodiments, the flake conductive material in the composition of the functional layer 22 may include graphite or graphene, for example, KS series graphite, but the present disclosure is not limited thereto, other suitable flake conductive materials are applicable to the present disclosure. In some embodiments, the dimension of the flake conductive material is approximately in the micron scale, and its dimension is approximately between 0.5 µm and 20 µm, for example, between about 1 µm and about 8 µm. In some embodiments, the spherical conductive material in the composition of the functional layer 22 may include conductive carbon materials, such as Super P (Timcal) and ECP series Ketjenblack (LION Co. Ltd.), but the present disclosure is not limited thereto, other suitable spherical conductive materials are applicable to the present disclosure. In some embodiments, the dimension of the spherical conductive material is approximately in the nano scale, and its dimension is approximately between 10 nm and 1,000 nm, for example, between about 30 nm and about 100 nm. In the present disclosure, the flake conductive materials added to the functional layer 22 are mostly arranged in a planar manner to form a specific directionality, which is conducive to improving the effect of current blocking.

In some embodiments, the thermoplastic elastomer in the composition of the functional layer 22 may include fluoropolymer elastomer, polyolefin elastomer, polyamide elastomer, polyimide elastomer, polyester elastomer, polyurethane elastomer or polycarbonate elastomer, for example, poly(vinylidene fluoride) (PVDF), but the present disclosure is not limited thereto, other suitable thermoplastic elastomers are applicable to the present disclosure. In some embodiments, the nitrogen-containing hyperbranched polymer in the composition of the functional layer 22 may be polymerized from bismaleimide (BMI) monomers, for example, polymerized from 4,4'-diphenylmethane bismaleimide or bisphenol A diphenyl ether bismaleimide, but the present disclosure is not limited thereto, other suitable bismaleimide (BMI) monomer derivatives are applicable to the polymerization of the nitrogen-containing hyperbranched polymer of the present disclosure. In some embodiments, the molecular weight of the nitrogen-containing hyperbranched polymer is approximately between 5,000 and 1,500,000, such as between 20,000 and 1,000,000.

In some embodiments, the thermoplastic elastomer and the nitrogen-containing hyperbranched polymer form an interpenetrating polymer network (IPN). In some embodiments, the composition of the functional layer 22 further includes 0.1-5 parts by weight of bromine-containing compounds, for example, 0.1-1.5 parts by weight of bromine-containing compounds. In some embodiments, the bromine-containing compound may include, for example, 1,2-Bis(2,3,4,5,6-pentabromophenyl)ethane, but the present disclosure is not limited thereto, other suitable bromine-containing compounds are applicable to the present disclosure. The disclosed bromine-containing compounds have flame-retardant properties, which is conducive to improving battery safety.

In some embodiments, the thickness of the functional layer 22 is approximately between 1 µm and 20 µm.

Figure 3:
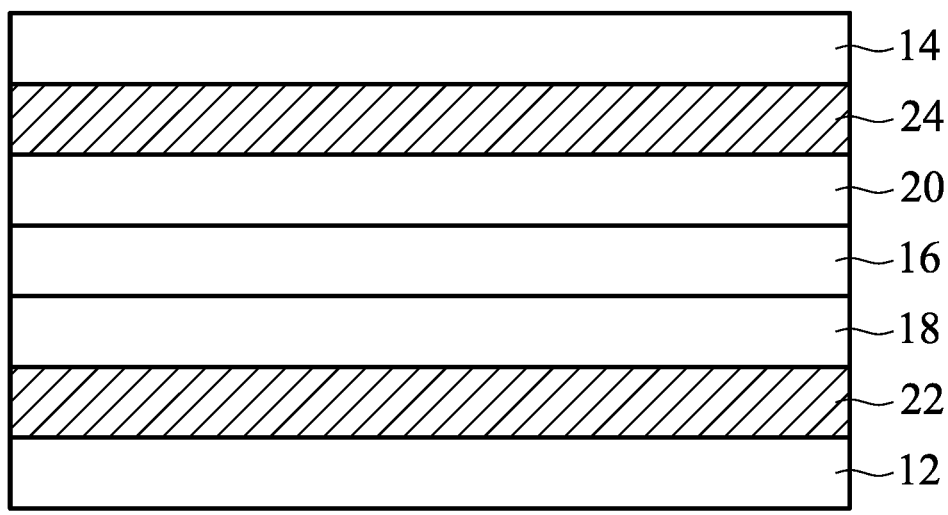
FIG. 3 is a cross-sectional view of a lithium battery structure in accordance with one embodiment of the disclosure.

Referring to FIG. 3, in accordance with one embodiment of the disclosure, a lithium battery structure 10 is provided. FIG. 3 is a cross-sectional view of the lithium battery structure 10.

As shown in FIG. 3, the lithium battery structure 10 includes a first metal layer 12, a second metal layer 14, a separator 16, a first electrode layer 18, a second electrode layer 20, a first functional layer 22 and a second functional layer 24. The first metal layer 12 is opposite to the second metal layer 14. The separator 16 is disposed between the first metal layer 12 and the second metal layer 14. The first electrode layer 18 is disposed between the first metal layer 12 and the separator 16. The second electrode layer 20 is disposed between the second metal layer 14 and the separator 16. The first functional layer 22 is disposed between the first metal layer 12 and the first electrode layer 18. The second functional layer 24 is disposed between the second metal layer 14 and the second electrode layer 20. Specifically, each of the first functional layer 22 and the second functional layer 24 includes a composition. The composition includes 20-80 parts by weight of flake conductive material, 1-30 parts by weight of spherical conductive material, 10-50 parts by weight of thermoplastic elastomer and 1-25 parts by weight of nitrogen-containing hyperbranched polymer, based on 100 parts by weight of the composition. In some embodiments, the composition in the first functional layer 22 and the second functional layer 24 may include 40-75 parts by weight of flake conductive material, 3-25 parts by weight of spherical conductive material, 15-35 parts by weight of thermoplastic elastomer and 3-15 parts by weight of nitrogen-containing hyperbranched polymer, based on 100 parts by weight of the composition. In some embodiments, the composition in the first functional layer 22 and the second functional layer 24 may include 48-65 parts by weight of flake conductive material, 5-18 parts by weight of spherical conductive material, 18-28 parts by weight of thermoplastic elastomer and 5-10 parts by weight of nitrogen-containing hyperbranched polymer, based on 100 parts by weight of the composition.

In some embodiments, the first metal layer 12 may include aluminum foil or stainless steel foil, used as a metal current collector. In some embodiments, the second metal layer 14 may include copper foil, nickel foil or stainless steel foil, used as a metal current collector.

In some embodiments, the first electrode layer 18 is a positive electrode, which may include a positive electrode active material, a conductive material and a binder. In some embodiments, the positive electrode active material may include $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$ ($0<y<1$), $LiCo_{1-y}Mn_yO_2$ ($0<y<1$), $LiNi_{1-y}Mn_yO_2$ ($0<y<1$), $Li(Ni_aCo_bMn_c)O_4$ ($0<a<2$, $0<b<2$, $0<c<2$, $a+b+c=2$), $LiMn_{2-z}Ni_zO_4$ ($0<z<2$), $LiMn_2$—$Co_zO_4$ ($0<z<2$), $LiNi_xCo_yAl_zO_2$ ($0<x$, $y$, $z<1$), $LiCoPO_4$, $LiFePO_4$ or a combination thereof, but the present disclosure is not limited thereto, and other suitable positive electrode active materials are applicable to the present disclosure. In some embodiments, the conductive material suitable for use in the positive electrode may include carbon black, conductive graphite, carbon nanotube, carbon fiber or graphene, but the present disclosure is not limited thereto, and other conductive materials applicable to the positive electrode are applicable to the present disclosure. In some embodiments, the binder suitable for use in the positive electrode may include polyvinyl alcohol, polytetrafluoroethylene, carboxymethyl cellulose, polyvinylidene fluoride, polystyrene butadiene copolymer, fluorinated rubber, polyurethane, polyvinyl pyrrolidone, polyethyl acrylate, polyvinyl chloride, polyacrylonitrile, polybutadiene, polyacrylic acid or a combination thereof, but the present disclosure is not limited thereto, and other binders applicable to the positive electrode are applicable to the present disclosure. In some embodiments, the second electrode layer 20 is a negative electrode, which may include a negative electrode active material, a conductive material and a binder. In some embodiments, the negative electrode active material may include lithium, carbon materials, lithium-containing compounds, silicon-containing materials or a combination thereof, but the present disclosure is not limited thereto, and other suitable negative electrode active materials are applicable to the present disclosure. In some embodiments, the carbon material may include mesophase carbon micro beads (MCMB), coke, carbon black, graphite, graphene, acetylene black, carbon fiber or a combination thereof. In some embodiments, the lithium-containing compound may include LiAl, LiMg, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$ or $Li_{2.6}Cu_{0.4}N$. In some embodiments, the silicon-containing material may include siloxane ceramics, silicon carbon or silicon-based negative electrode material. In some embodiments, the conductive material suitable for use in the negative electrode may include carbon black, conductive graphite, carbon nanotube, carbon fiber or graphene, but the present disclosure is not limited thereto, and other conductive materials applicable to the negative electrode are applicable to the present disclosure. In some embodiments, the binder suitable for use in the negative electrode may include polyvinyl alcohol, polytetrafluoroethylene, carboxymethyl cellulose, polyvinylidene fluoride, polystyrene butadiene copolymer, fluorinated rubber, polyurethane, polyvinyl pyrrolidone, polyethyl acrylate, polyvinyl chloride, polyacrylonitrile, polybutadiene, polyacrylic acid or a combination thereof, but the present disclosure is not limited thereto, and other binders applicable to the negative electrode are applicable to the present disclosure.

In some embodiments, the flake conductive material in the composition of the first functional layer 22 and the second functional layer 24 may include graphite or graphene, for example, KS series graphite, but the present disclosure is not limited thereto, other suitable flake conductive materials are applicable to the present disclosure. In some embodiments, the dimension of the flake conductive material is approximately in the micron scale, and its dimension is approximately between 0.5 μm and 20 μm, for example, between about 1 μm and about 8 μm. In some embodiments, the spherical conductive material in the composition of the first functional layer 22 and the second functional layer 24 may include conductive carbon materials, such as Super P (IMERYS Graphite & Carbon SA) and ECP series Ketjenblack (LION Co. Ltd.), but the present disclosure is not limited thereto, other suitable spherical conductive materials are applicable to the present disclosure. In some embodiments, the dimension of the spherical conductive material is approximately in the nano scale, and its dimension is approximately between 10 nm and 1,000 nm, for example, between about 30 nm and about 100 nm. In the present disclosure, the flake conductive materials added to the first functional layer 22 and the second functional layer 24 are mostly arranged in a planar manner to form a specific directionality, which is conducive to improving the effect of current blocking.

In some embodiments, the thermoplastic elastomer in the composition of the first functional layer 22 and the second functional layer 24 may include fluoropolymer elastomer, polyolefin elastomer, polyamide elastomer, polyimide elastomer, polyester elastomer, polyurethane elastomer or polycarbonate elastomer, for example, poly(vinylidene fluoride) (PVDF), but the present disclosure is not limited thereto, other suitable thermoplastic elastomers are applicable to the present disclosure. In some embodiments, the nitrogen-containing hyperbranched polymer in the composition of the first functional layer 22 and the second functional layer 24 may be polymerized from bismaleimide (BMI) monomers, for example, polymerized from 4,4'-diphenylmethane bismaleimide or bisphenol A diphenyl ether bismaleimide, but the present disclosure is not limited thereto, other suitable bismaleimide (BMI) monomer derivatives are applicable to the polymerization of the nitrogen-containing hyperbranched polymer of the present disclosure. In some embodiments, the molecular weight of the nitrogen-containing hyperbranched polymer is approximately between 5,000 and 1,500,000, such as between 20,000 and 1,000,000.

In some embodiments, the thermoplastic elastomer and the nitrogen-containing hyperbranched polymer form an interpenetrating polymer network (IPN). In some embodiments, the composition of the first functional layer 22 and the second functional layer 24 further includes 0.1-5 parts by weight of bromine-containing compounds, for example, 0.1-1.5 parts by weight of bromine-containing compounds. In some embodiments, the bromine-containing compound may include, for example, 1,2-Bis(2,3,4,5,6-pentabromophenyl)ethane, but the present disclosure is not limited thereto, other suitable bromine-containing compounds are applicable to the present disclosure. The disclosed bromine-containing compounds have flame-retardant properties, which is conducive to improving battery safety.

In some embodiments, the thickness of the first functional layer 22 and the second functional layer 24 is approximately between 1 μm and 20 μm, respectively.

Preparation Example 1

Preparation of Thermoplastic Elastomer (PVDF)

First, 720 g of N-methyl-2-pyrrolidone (NMP) solvent (purchased from BASF) was added to a 960-mL (φ95 mm×H170 mm) straight glass bottle, and a 50-mm stainless steel stirring wing was installed therein. Next, 80 g of poly(vinylidene fluoride) (PVDF) powder (the molecular weight was about 1.3 million) (PVDF 5130, purchased from Solvay) was added to the above NMP solvent. The straight glass bottle containing a PVDF 5130/NMP solution was placed in a 25° C. circulating water tank. The stirring speed was adjusted to about 1,000 rpm for continuous stirring until PVDF 5130 powder was completely dissolved in NMP solvent. Next, the completely dissolved 10 wt % PVDF 5130/NMP solution was allowed to stand at room temperature for 12 hours. After the solution presented clear and transparent, the solution was stored in a dry box maintained at 20% RH for the required use.

Preparation Example 2

Preparation of Nitrogen-Containing Hyperbranched Polymer (PolyBMI)

First, 760 g of NMP solvent was added to a 1000-mL three-necked round bottom flask, and a 3-cm straight PTFE stir bar was put therein. Next, 40 g of mixed powder (BMI1000/BMI4000=3/1) composed of 4,4'-diphenylmethane bismaleimide (the molecular weight was about 1,000) (BMI1000, purchased from Hakuei) and bisphenol A diphenyl ether bismaleimide (the molecular weight was about 4,000) (BMI4000, purchased from Daiwakasei Industry) was added to the above NMP solvent. The three-necked round bottom flask containing a BMI1000/BMI4000/NMP solution was placed in an oil bath. The stirring speed was adjusted (approximately to the middle position in the knob-adjustment area of the heater), with stirring at room temperature, the mixed powder of BMI1000 and BMI4000 was completely dissolved in NMP solvent. Next, the heating temperature of the heater was set to 130° C. The oil bath and the three-necked round bottom flask containing the BMI1000/BMI4000/NMP solution were heated under stable stirring and condensate reflux conditions. After BMI1000 and BMI4000 were synthesized by reacting in NMP at 130° C. for a period of time, the products were taken out and analyzed by GPC to determine the degree of reaction. The molecular weight of the synthesized PolyBMI with a hyperbranched structure was approximately 20,000-200,000. In accordance with the GPC analysis results, when not many BMI1000 and BMI4000 monomers were left, or the peak positions and peak values of the GPC spectrum were not changed significantly, the reaction was terminated. The pot was collected, and 800 g of the synthesized 5 wt % Poly[BMI1000/BMI4000]/NMP solution was poured into a 1000-mL serum bottle and stored in a refrigerator at 5° C. for the required use.

Preparation Example 3

Preparation of Nitrogen-Containing Hyperbranched Polymer/Bromine-Containing Compound (PolyBMI/BPBPE)

First, 760 g of NMP solvent was added to a 1000-mL three-necked round bottom flask, and a 3-cm straight PTFE stir bar was put therein. Next, 40 g of mixed powder (BMI1000/BMI4000=3/1) composed of BMI1000 and BMI4000 was added to the above NMP solvent. The three-necked round bottom flask containing a BMI1000/BMI4000/NMP solution was placed in an oil bath. The stirring speed was adjusted (approximately to the middle position in the knob-adjustment area of the heater), with stirring at room temperature, the mixed powder of BMI1000 and BMI4000 was completely dissolved in NMP solvent. Next, 0.4 g of 1,2-Bis(2,3,4,5,6-pentabromophenyl)ethane (BPBPE) (purchased from TCI-Tokyo Chemical Industry) was added to the BMI1000/BMI4000/NMP solution. Since BPBPE was almost insoluble in NMP solvent, BPBPE was merely dispersed in the solution by stirring. At this time, the solution appeared milky yellow and turbid. Next, the heating temperature of the heater was set to 130° C. The oil bath and the three-necked round bottom flask containing the BMI1000/BMI4000/BPBPE/NMP solution were heated under stable stirring and condensate reflux conditions. In the BMI1000/BMI4000/BPBPE/NMP solution, the polymerization reaction of BMI1000 and BMI4000 was performed as the temperature increased. The solution was quickly changed from milky yellow turbid liquid to brown clear liquid. The pre-extracted liquid was placed in a 20-mL sample bottle for observation. As the temperature dropped, the precipitation was visible gradually. As the reaction time lengthened, the hyperbranched structure was partially constructed, and the molecular weight thereof was between 20,000-200,000. BPBPE was embedded into the structure. After the solution was reacted for 48 hours, in the constructed hyperbranched structure group, most of BPBPE was embedded into the structure. Therefore, when the solution was taken out and placed in a 20-mL sample bottle and returned to room temperature for observation, there was almost no precipitation. The pot was collected, and 800 g of the synthesized 5 wt % Poly[BMI1000/BMI4000/BPBPE]/NMP solution was poured into a 1000-mL serum bottle and stored in a refrigerator at 5° C. for the required use.

Preparation Example 4

Preparation of Functional Layer Composition (BMI/Super P (Spherical Conductive Material)/KS4 (Flake Conductive Material)/PVDF/NMP)

Step 1:
180.69 g of NMP solvent was added to a 960-mL (φ95 mm×H170 mm) straight glass bottle, and a 50-mm stainless steel stirring wing was installed therein. The straight glass bottle was placed in a 25° C. circulating water tank. The stirring speed was adjusted to about 1,000 rpm. 9.51 g of BMI4000 was poured into NMP solvent with stirring until BMI4000 was completely dissolved in NMP solvent.

Step 2:
81.2 g of 12.5 wt % super P/NMP solution (purchased from GREEN CHEM TAIWAN CO., LTD.) (i.e. 10.15 g of super P) was added to the straight glass bottle containing a slurry-blended composition with continued stirring at room temperature until super P was evenly dispersed in the BMI/NMP solution.

Step 3:
285.5 g of 10 wt % PVDF 5130/NMP solution was slowly added to the mixed solution obtained in Step 1. The stirring speed was increased to 1,500 rpm, with continued stirring, until the solution appeared uniform dispersion.

Step 4:
78.68 g of KS4 (purchased from IMERYS Graphite & Carbon) was slowly added to the mixed solution obtained in Step 2 batch by batch (about 8-10 g per batch) with continued stirring at 1,500 rpm. When the solution appeared uniform dispersion, the next batch of KS4 was added.

Step 5:
If the slurry was thicker and less uniformly dispersed, the stirring speed was increased to 2,000 rpm to 4,000 rpm. If the dispersion was more uniform or the consistency was significantly reduced, the speed was adjusted back to 1,500 rpm with continued stirring (since high-speed stirring caused excessive temperature). After all of the KS4 was poured into the straight glass bottle containing the slurry-blended composition, with continued stirring for 2 hours, the preparation of the functional layer composition (BMI/super P/KS4/PVDF/NMP) was complete.

Preparation Example 5

Preparation of Functional Layer Composition (PolyBMI/Super P/KS4/PVDF/NMP)

Step 1:
190.2 g of 5 wt % PolyBMI/NMP solution and 81.2 g of 12.5 wt % super P/NMP solution were added to a 960-mL (φ95 mm×H170 mm) straight glass bottle. The straight glass bottle containing a slurry-blended composition was placed in a 25° C. circulating water tank with a 50-mm stainless steel stirring wing installed therein. The stirring speed was adjusted to about 1,000 rpm, with continued stirring at room temperature, until super P was evenly dispersed in the PolyBMI/NMP solution.

Step 2:
285.5 g of 10 wt % PVDF 5130/NMP solution was slowly added to the mixed solution obtained in Step 1. The stirring speed was increased to 1,500 rpm, with continued stirring, until the solution appeared uniform dispersion.

Step 3:

78.68 g of KS4 was slowly added to the mixed solution obtained in Step 2 batch by batch (about 8-10 g per batch) with continued stirring at 1,500 rpm. When the solution appeared uniform dispersion, the next batch of KS4 was added.

Step 4:

If the slurry was thicker and less uniformly dispersed, the stirring speed was increased to 2,000 rpm to 4,000 rpm. If the dispersion was more uniform or the consistency was significantly reduced, the speed was adjusted back to 1,500 rpm with continued stirring (since high-speed stirring caused excessive temperature). After all of the KS4 was poured into the straight glass bottle containing the slurry-blended composition, with continued stirring for 2 hours, the preparation of the functional layer composition (PolyBMI/super P/KS4/PVDF/NMP) was complete.

Preparation Example 6

Preparation of Functional Layer Composition (PolyBMI/BPBPE/Super P/KS4/PVDF/NMP)

Step 1:

190.2 g of 5 wt % PolyBMI/BPBPE/NMP solution and 81.2 g of 12.5 wt % super P/NMP solution were added to a 960-mL (φ95 mm×H170 mm) straight glass bottle. The straight glass bottle containing a slurry-blended composition was placed in a 25° C. circulating water tank with a 50-mm stainless steel stirring wing installed therein. The stirring speed was adjusted to about 1,000 rpm, with continued stirring at room temperature, until super P was evenly dispersed in the PolyBMI/NMP solution.

Step 2:

285.5 g of 10 wt % PVDF 5130/NMP solution was slowly added to the mixed solution obtained in Step 1. The stirring speed was increased to 1,500 rpm, with continued stirring, until the solution appeared uniform dispersion.

Step 3:

78.68 g of KS4 was slowly added to the mixed solution obtained in Step 2 batch by batch (about 8-10 g per batch) with continued stirring at 1,500 rpm. When the solution appeared uniform dispersion, the next batch of KS4 was added.

Step 4:

If the slurry was thicker and less uniformly dispersed, the stirring speed was increased to 2,000 rpm to 4,000 rpm. If the dispersion was more uniform or the consistency was significantly reduced, the speed was adjusted back to 1,500 rpm with continued stirring (since high-speed stirring caused excessive temperature). After all of the KS4 was poured into the straight glass bottle containing the slurry-blended composition, with continued stirring for 2 hours, the preparation of the functional layer composition (PolyBMI/BPBPE/super P/KS4/PVDF/NMP) was complete.

Test Example 1

The Alteration of Z-Axis Dimension of the Functional Layer with Temperature Rise In this example, a thermal mechanical analyzer (TMA) test was performed for single functional layer (sample: L×W×H=3 mm×3 mm×4 mm).

TMA samples were prepared as follows. The slurry of the functional layer composition obtained in Preparation Example 4 was repeatedly coated and dried until the film thickness reached 4 mm. Three structures (the dimension of each structure was 3 mm×3 mm×4 mm) were cut out from the 4 mm-thick functional layer (a dry film) as TMA test samples.

TMA testing equipment: TMA Q400 (testing software: V22.5 Build 31).

Testing conditions: In a nitrogen environment, the heating rate was 10° C./min, and the temperature was raised to 300° C.

Figure 4:
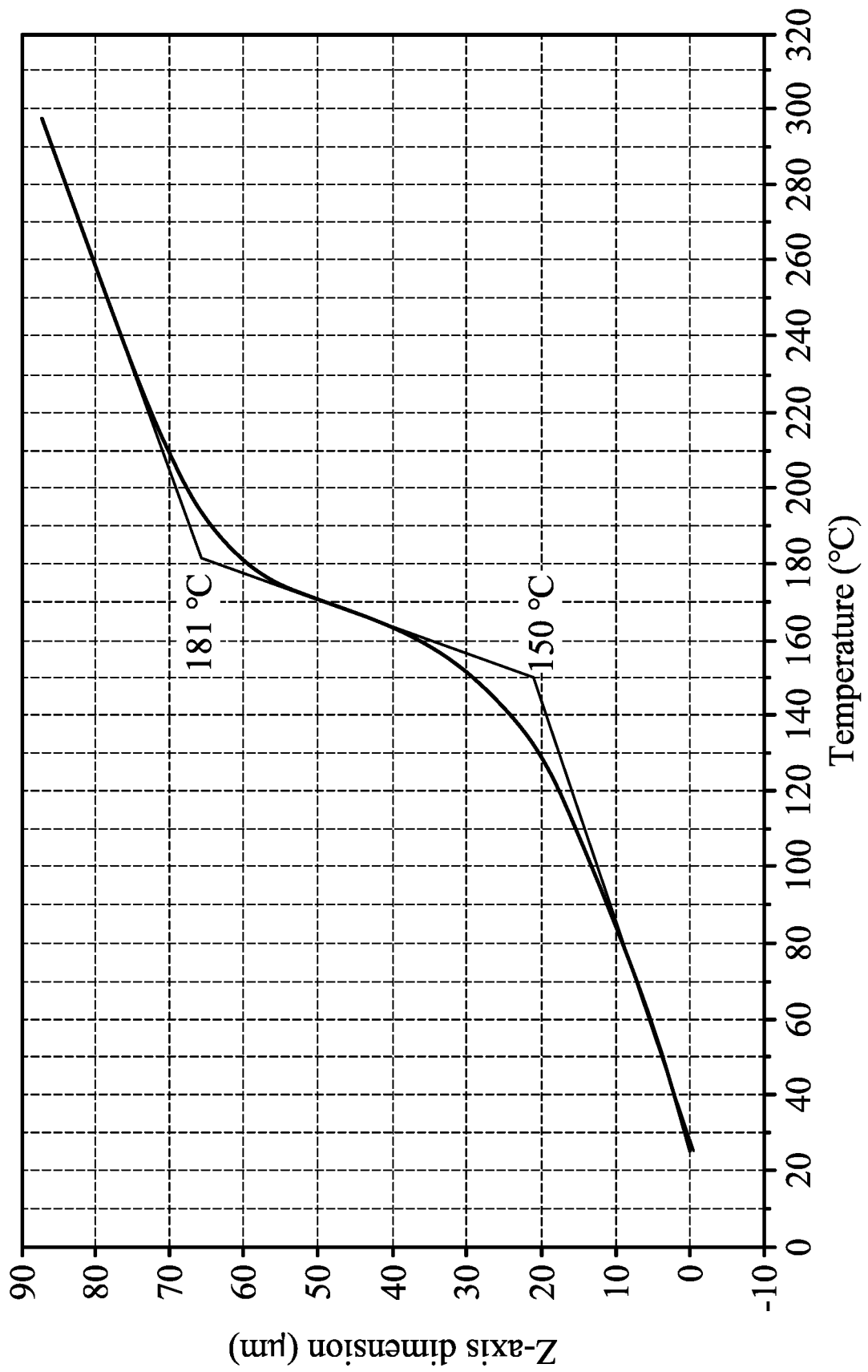
FIG. 4 shows an alteration of Z-axis dimension of the functional layer with temperature rise in accordance with one embodiment of the disclosure.

The TMA test results are shown in FIG. 4. FIG. 4 also shows the alteration of Z-axis dimension of the samples with temperature rise. When the temperature was less than 130° C., the coefficient of expansion of the sample did not alter much with temperature rise, and it was reversible. When the temperature reached between 130° C. and 180° C., the Z-axis dimension of the sample presented the most obvious alteration of positive expansion, and the reversible property gradually disappeared. When the temperature exceeded 180° C., the material of the sample was reacted by itself, and its coefficient of expansion was continuously altered as temperature rise, and its reversible properties was lost and cannot be recovered.

Test Example 2

The Alteration of Resistance Value of the Functional Layer with Temperature Rise In a composite layer of a functional layer and an aluminum foil, the alteration of the resistance value of the functional layer with temperature rise was tested.

Resistance Test Workflow:

(1) A test electrode plate was cut, and sample 1 and sample 2 with a test area (excluding exposed aluminum foil) of 2.5 cm×3.5 cm were cut out respectively. Mitutoyo micrometer (model: 293-230-30) was used to measure and record the film thickness of the test samples. In sample 1, the thickness of the functional layer was 8 μm, the thickness of the aluminum foil was 15 μm, and the composition of the functional layer obtained in Preparation Example 5 was PolyBMI/super P/KS4/PVDF 5130. In sample 2, the thickness of the functional layer was 5 μm, the thickness of the aluminum foil was 15 μm, and the composition of the functional layer obtained in Preparation Example 6 was PolyBMI/BPBPE/super P/KS4/PVDF 5130. The aluminum foil was purchased from UACJ Foil Company.

(2) The test sample was placed on a test position of a test instrument. The data shown on the instrument was checked. The contact between an electrode rod, a temperature probe and the test sample was confirmed.

(3) The test sample assembly was put in the oven, and the conditions of the oven temperature to rise (for example: from room temperature to 200° C. within one hour) was set. The data shown on the instrument was checked again. The contact between the electrode rod, the temperature probe and the test sample was confirmed.

(4) A PC/EC/DEC (=21.4 wt %/35.6 wt %/43.0 wt %) combination solution of electrolyte without lithium salt was dropped between the electrode rod and the test sample. The window door of the oven was closed and the heating mechanism was started.

(5) The alteration of temperature and resistance value was observed and recorded.

Figure 5:
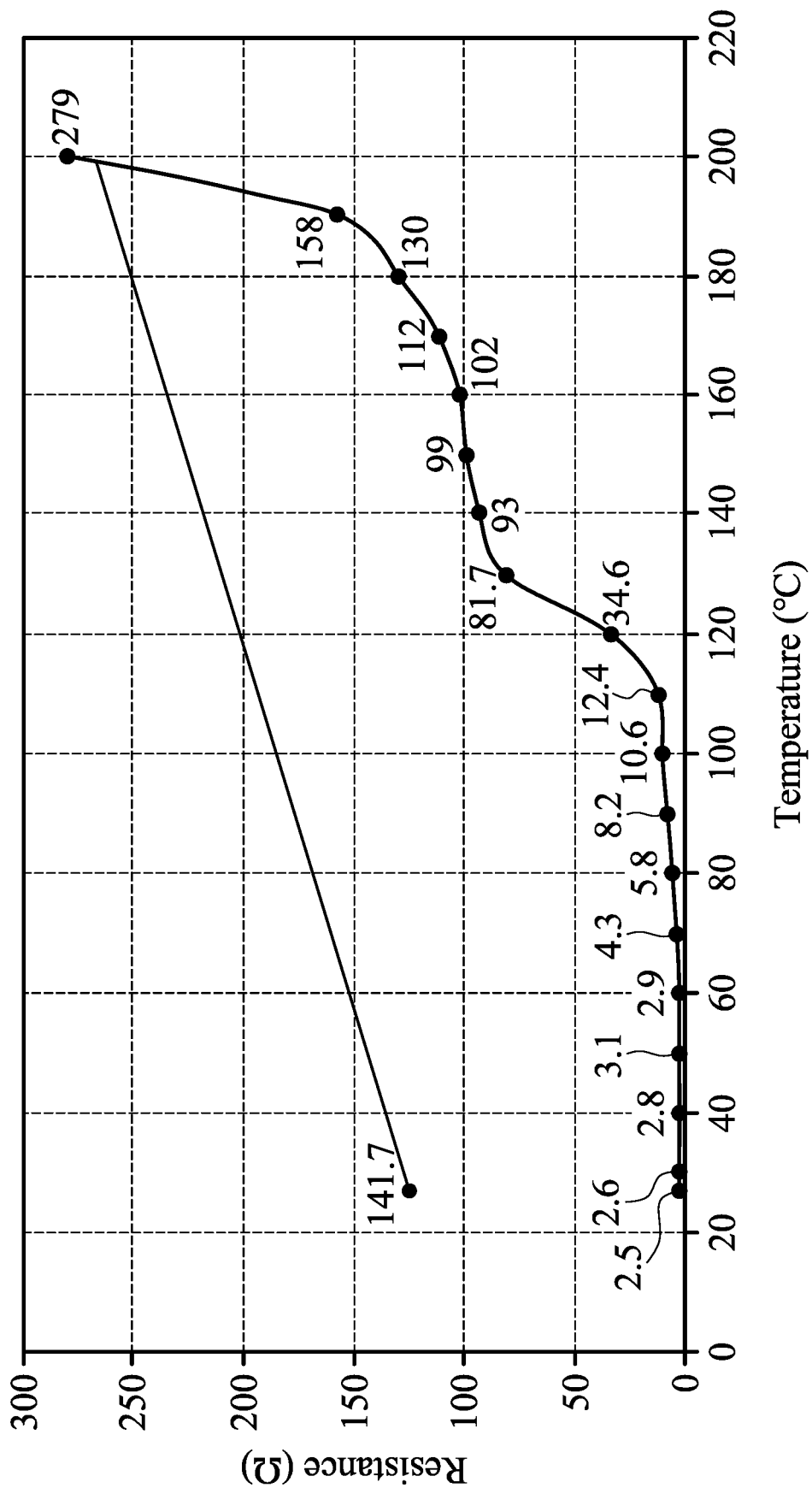
FIG. 5 shows an alteration of resistance value of the functional layer with temperature rise in accordance with one embodiment of the disclosure.

The test results of sample 1 are shown in FIG. 5. The resistance value of the functional layer (PolyBMI/super P/KS4/PVDF 5130) began to generate great alteration above 120° C. When above 160° C., more alteration was generated, and the resistance value was up to 279Ω at 200° C. The rise rate of the resistance exceeded 100 times. After returning to room temperature, the resistance value of the test sample was 141.7Ω, which can no longer return to the original value of 2.5Ω.

Figure 6:
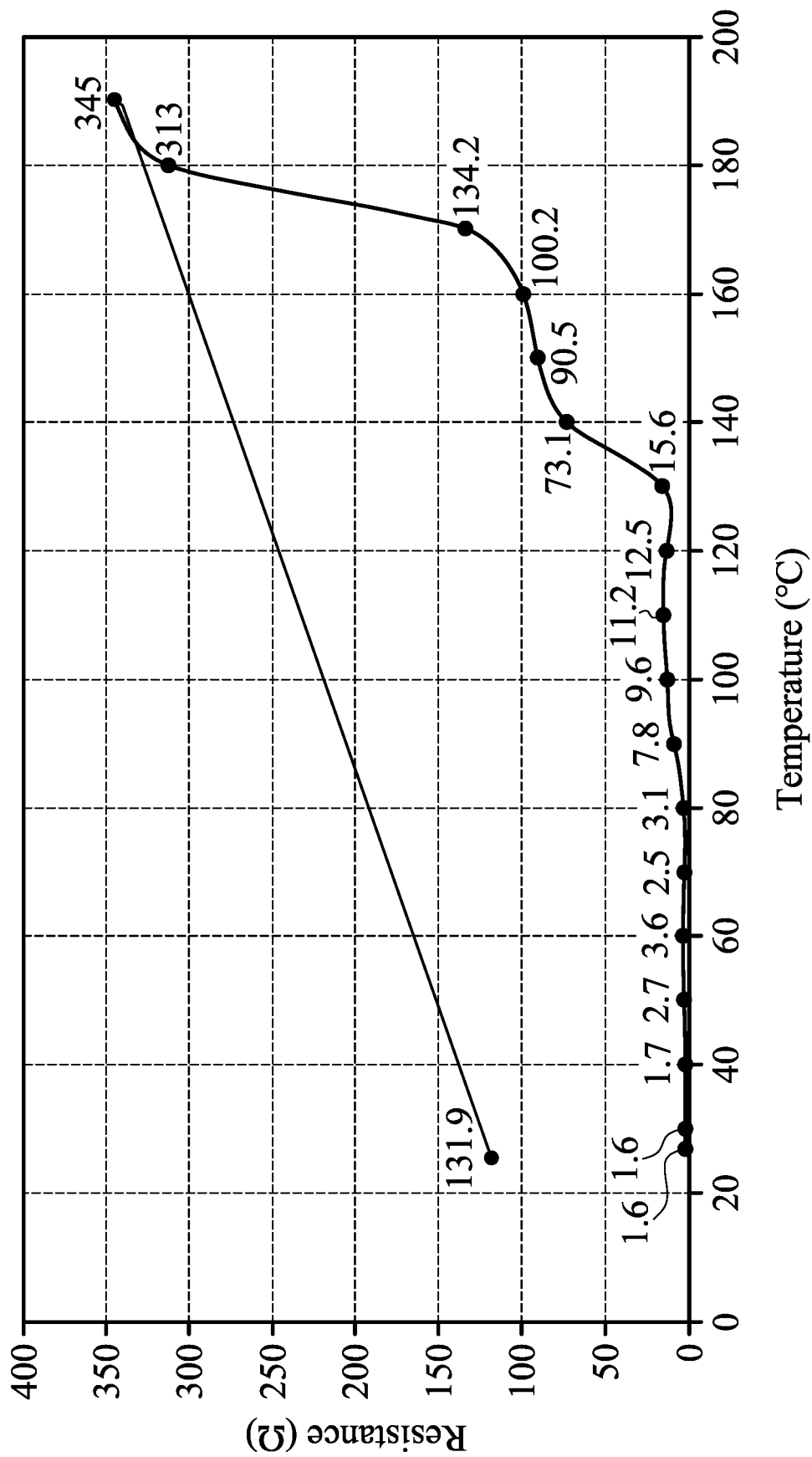
FIG. 6 shows an alteration of resistance value of the functional layer with temperature rise in accordance with one embodiment of the disclosure.

The test results of sample 2 are shown in FIG. 6. The resistance value of the functional layer (PolyBMI/BPBPE/super P/KS4/PVDF 5130) reached 345Ω, when the temperature reached 190° C. The rise rate of the resistance was more than 200 times. After returning to room temperature, the resistance value of the test sample was 131.9Ω. Obviously, the structure of the functional layer was altered irreversibly with temperature alterations.

Test Example 3

The Alteration of Resistance Value of the Functional Layer with Temperature Rise In an electrode plate (including a positive electrode (an active layer), a functional layer and an aluminum foil), the alteration of the resistance value of the functional layer with temperature rise was tested.

Control group: The composition of the electrode plate included 96% of NMC (nickel manganese cobalt; positive active material), 2% of PVDF 5130 (adhesive) and 2% of super P (conductive material).

Sample: The composition of the functional layer in the electrode plate included 8% of super P (spherical conductive material), 62% of KS4 (flake conductive material), 22.5% of PVDF 5130 (thermoplastic elastomer) and 7.5% of PolyBMI/BPBPE (nitrogen-containing hyperbranched polymer/bromine-containing compound). The electrode plate containing the functional layer, a negative electrode (copper foil material purchased from Changchun Copper Foil Company), a separator, and an electrolyte were assembled to form an 8 mAh battery. The battery was charged at 0.1 C to achieve a full state of charge (SOC=100%) After that, the battery was disassembled within a glove box with an argon atmosphere. The electrode plate was taken out and encapsulated in a high-pressure titanium tube with the electrolyte with a weight ratio of 1:1. The temperature was increased to 150° C. and 180° C. for 30 minutes respectively. After that, the electrode plate was moved out and the resistance value was measured and recorded with a four-point probe impedance measuring instrument.

Figure 7:
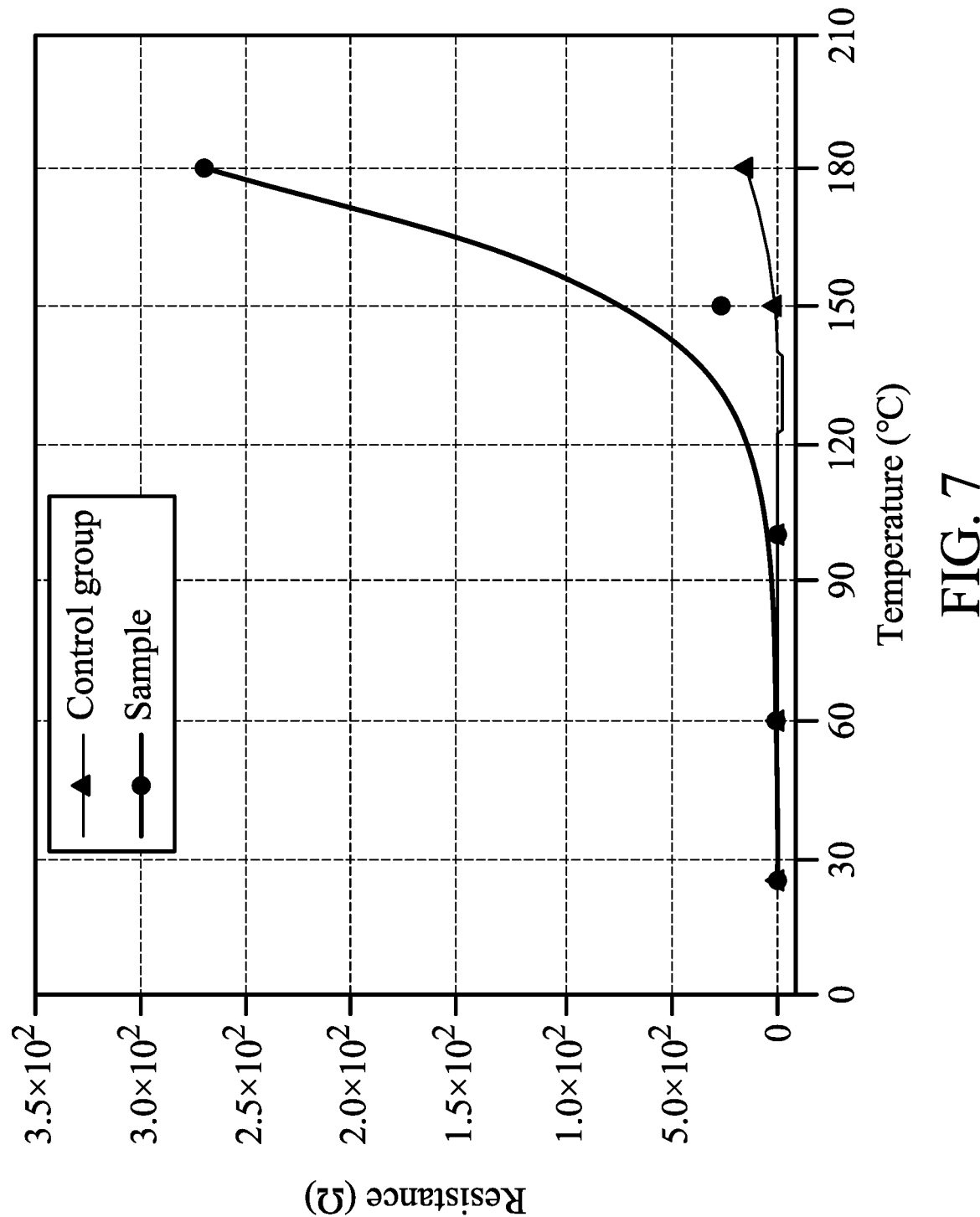
FIG. 7 shows an alteration of resistance value of the battery plate with temperature rise in accordance with one embodiment of the disclosure.

The test results are shown in FIG. 7. According to the measurement results of the resistance value, when the temperature was higher than 150° C., the resistance value of the functional layer in the sample was raised sharply. When the temperature reached 180° C., its resistance value had reached 275 times the resistance value at the normal temperature. However, in the control group, the resistance value of the electrode plate had little alteration.

Test Example 4

Battery Characteristic Test

The functional layer (composed of 8% of super P, 62% of KS4, 22.5% of PVDF 5130 and 7.5% of PolyBMI/BPBPE) was conducted into a 4.7 Ah battery. First, the 5 μm-thick functional layer was coated on an aluminum foil substrate. Next, an active layer of NCA (LiNixCoyAlzO$_2$ (0<x, y, z<1)) was coated on the functional layer. The 4.7 Ah battery (sample) was assembled. The performance of the battery (sample) was compared with that of the electrode plate (control group) without a functional layer and only coated with a NCA active layer.

Test method: The charge and discharge machine (Maccor) was used for battery electrical test to evaluate battery capacity. Firstly, the battery was charged to 4.2V at 0.2 C, and then the voltage was fixed at 4.2V until the charging current was less than 0.05 C to complete the battery charging procedure. A discharging procedure was then performed. The battery was discharged to 3.0V at 0.2 C to complete the battery discharging procedure. Three consecutive charge and discharge procedures were performed to complete the battery pre-formation process. The test results are shown in Table 1.

TABLE 1

| Group (test) | Electrode coating | Gram capacity (0.2 C) mAh/g | Energy density (Wh/kg) |
|---|---|---|---|
| Control group (test 1) | NCA | 176.1 | 247 |
| Control group (test 2) | NCA | 176.5 | 247 |
| Control group (test 3) | NCA | 175.1 | 246 |
| Test group (test 1) | NCA/functional layer/aluminum foil substrate | 174.7 | 246 |
| Test group (test 2) | NCA/functional layer/aluminum foil substrate | 174.6 | 246 |
| Test group (test 3) | NCA/functional layer/aluminum foil substrate | 174.7 | 246 |

According to the test results, it can be known that the setting of the additional functional layer in the battery structure does not affect the battery's performance.

In the present disclosure, the functional layer with a specific composition (including specific parts by weight of flake conductive material, spherical conductive material, thermoplastic elastomer, nitrogen-containing hyperbranched polymer or bromine-containing compound, etc., wherein the thermoplastic elastomer and the nitrogen-containing hyperbranched polymer form an interpenetrating polymer network (IPN)) is arranged between the metal layer and the positive electrode or between the metal layer and the negative electrode, or between the metal layer and the positive electrode and between the metal layer and the negative electrode in the battery structure. The functional layer can be used as a current blocking layer and has the characteristics of high Z-axis volume variation. When the battery encounters abnormal conditions and the temperature rises sharply, for example, the temperature exceeding 150° C., the functional layer produces irreversible Z-axis expansion due to alterations of the internal polymer structure, causing the chain mechanism of the conductive network inside the functional layer to be affected or even cut off and destroyed. In this situation, the resistance rises rapidly, and the electron conduction and electrochemical reaction are terminated, ensuring battery safety at high temperatures. The characteristics that the combined-layer structure and impedance vary with environmental temperature alterations has the functional benefits of current regulation and current blocking.

As the content of the thermoplastic elastomer that can be used as a binder in the functional layer increases, the functional layer can also be used as a bonding layer to form a comprehensive bonding with a metal foil, effectively improving the bonding strength between the electrode active layer and the metal foil. In addition, when a rolling process is performed, the functional layer can also be used as a buffer layer to resist the depression force from the active particles in the electrode active layer to the underlying metal foil, so that the metal foil will not cave during the rolling process to affect the current conduction. Furthermore, the functional layer arranged on the metal foil (copper or aluminum) can also resist the corrosion of the electrolyte, avoiding the metal foil from being corroded by solvents and oxidizing its own materials.

While the disclosure has been described by way of example and in terms of embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lithium battery structure, comprising:
   a first metal layer comprising aluminum foil or stainless steel foil;
   a second metal layer comprising copper foil, nickel foil or stainless steel foil opposite to the first metal layer;
   a separator disposed between the first metal layer and the second metal layer;
   a first electrode layer disposed between the first metal layer and the separator;
   a second electrode layer disposed between the second metal layer and the separator; and
   a first functional layer comprising a first composition disposed between the first metal layer and the first electrode layer, wherein the first composition comprises 20-80 parts by weight of flake conductive material, 1-30 parts by weight of spherical conductive material, 10-50 parts by weight of thermoplastic elastomer and 1-25 parts by weight of nitrogen-containing hyperbranched polymer, based on 100 parts by weight of the first composition, wherein the nitrogen-containing hyperbranched polymer is polymerized from only bismaleimide monomers, and the thermoplastic elastomer and the nitrogen-containing hyperbranched polymer form an interpenetrating polymer network (IPN), wherein the first functional layer further comprises 0.1-5 parts by weight of bromine-containing compound.

2. The lithium battery structure as claimed in claim 1, further comprising a second functional layer comprising a second composition disposed between the second metal layer and the second electrode layer, wherein the second composition comprises 20-80 parts by weight of flake conductive material, 1-30 parts by weight of spherical conductive material, 10-50 parts by weight of thermoplastic elastomer and 1-25 parts by weight of nitrogen-containing hyperbranched polymer, based on 100 parts by weight of the second composition.

3. The lithium battery structure as claimed in claim 1, wherein the flake conductive material comprises graphite or graphene, and the flake conductive material has a dimension which is in a range from 0.5 μm to 20 μm.

4. The lithium battery structure as claimed in claim 2, wherein the flake conductive material comprises graphite or graphene, and the flake conductive material has a dimension which is in a range from 0.5 μm to 20 μm.

5. The lithium battery structure as claimed in claim 1, wherein the spherical conductive material comprises conductive carbon material or conductive polymer, and the spherical conductive material has a dimension which is in a range from 10 nm to 1,000 nm.

6. The lithium battery structure as claimed in claim 2, wherein the spherical conductive material comprises conductive carbon material or conductive polymer, and the spherical conductive material has a dimension which is in a range from 10 nm to 1,000 nm.

7. The lithium battery structure as claimed in claim 1, wherein the thermoplastic elastomer comprises fluoropolymer elastomer, polyolefin elastomer, polyamide elastomer, polyimide elastomer, polyester elastomer, polyurethane elastomer or polycarbonate elastomer.

8. The lithium battery structure as claimed in claim 2, wherein the thermoplastic elastomer and the nitrogen-containing hyperbranched polymer form an interpenetrating polymer network (IPN).

9. The lithium battery structure as claimed in claim 2, wherein the first functional layer or the second functional layer further comprises 0.1-5 parts by weight of bromine-containing compound.

* * * * *